United States Patent [19]

Burdett

[11] Patent Number: 5,782,348
[45] Date of Patent: Jul. 21, 1998

[54] MULTIPLE DISC STORAGE CASE

[75] Inventor: Ronald K. Burdett, Strasburg, Ohio

[73] Assignee: Alpha Enterprises, Inc., North Canton, Ohio

[21] Appl. No.: 666,044

[22] Filed: Jun. 19, 1996

[51] Int. Cl.$^6$ ............................................. B65D 85/57
[52] U.S. Cl. ................................ 206/308.1; 206/310
[58] Field of Search ........................ 206/303, 307–313, 206/308.1, 308.2, 806

[56] References Cited

U.S. PATENT DOCUMENTS

| | | | |
|---|---|---|---|
| 4,535,888 | 8/1985 | Nusselder | 206/444 |
| 4,702,369 | 10/1987 | Philosophe | 206/312 |
| 5,101,971 | 4/1992 | Brobecker | 206/232 |
| 5,188,228 | 2/1993 | Barrett | 206/308.1 |
| 5,246,107 | 9/1993 | Long et al. | 206/308.1 |
| 5,249,677 | 10/1993 | Lim | 206/310 |
| 5,269,409 | 12/1993 | Brandt et al. | 206/309 |
| 5,284,242 | 2/1994 | Roth et al. | 206/310 |
| 5,284,243 | 2/1994 | Gelardi et al. | 206/310 |
| 5,284,248 | 2/1994 | Dunker | 206/444 |
| 5,361,903 | 11/1994 | Thiele | 206/312 |
| 5,363,956 | 11/1994 | Taniyama | 206/312 |
| 5,377,825 | 1/1995 | Sykes et al. | 206/444 |
| 5,402,882 | 4/1995 | Bandy et al. | 206/310 |
| 5,611,426 | 3/1997 | Warfield | 206/308.1 |

FOREIGN PATENT DOCUMENTS

| | | | |
|---|---|---|---|
| 3008466 | 9/1981 | Germany | 206/806 |
| 2243145 | 10/1991 | United Kingdom | 206/310 |
| 94/19806 | 9/1994 | WIPO | 206/308.1 |

*Primary Examiner*—Jimmy G. Foster
*Attorney, Agent, or Firm*—Sand & Sebolt

[57] ABSTRACT

A case for storing multiple compact discs has a base hingedly connected to a cover by a hinge panel and a pair of living hinges which provide for movement of the base and lid between open and closed positions. A pair of adjacent hubs are formed on the base with each hub capable of storing one compact disc. One hub is raised higher than the other to allow one compact disc to partially overlap the other compact disc and prevent contact therebetween. A pair of tabs extend inwardly from the lid to store graphics and prevent the graphics from contacting the two stored compact discs. A second embodiment is free of the tabs and includes two additional hubs formed on the lid which allow the case to store up to four compact discs. The hubs formed on the lid are identical to the hubs formed on the base with one hub being raised higher than the other to allow one of the discs to partially overlap the other and prevent contact therebetween.

10 Claims, 4 Drawing Sheets

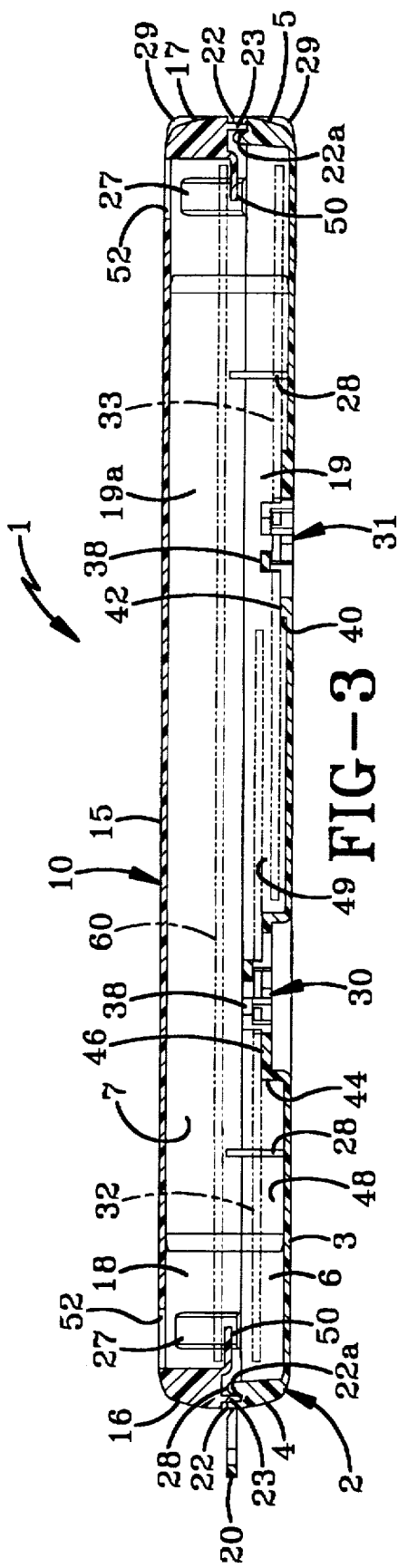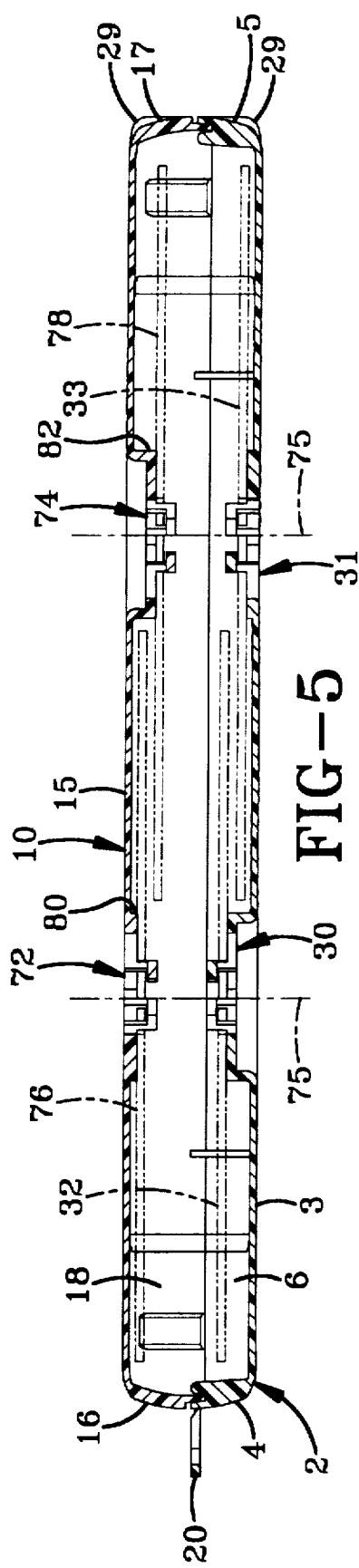

MULTIPLE DISC STORAGE CASE

BACKGROUND OF THE INVENTION

1. Technical Field

The invention relates to storage cases. More particularly, the invention relates to a storage case for storing up to four compact discs. Even more particularly, the invention relates to a very compact storage case which stores two discs adjacent one another with one disc partially overlapping the other disc, and which stores two discs on a base of the case and either a graphics or two additional compact discs on a lid of the case.

2. Background Information

The emergence of the compact disc as a preferred data storage medium has led to the use of compact discs in various commercial industries, for example the music industry uses compact discs to store and play musical recordings, the video game industry uses compact discs to store and play games, and the computer industry uses compact discs to store and use software for multi-media applications.

Some of these compact disc applications require multiple compact discs to store all of the digitized data, for example, many compact disc audio albums are recorded on multiple compact discs, and longer multi-media applications require multiple compact discs to perform their particular functions. These multiple compact disc applications must be packaged in a case capable of storing a plurality of compact discs.

Users often wish to carry a plurality of audio compact discs to listen to in their car or along with a portable compact disc player. Because of the enlarged size and weight of the compact discs while enclosed in their jewel box the user may wish to carry a plurality of compact discs within one storage case and free of their jewel boxes.

Currently, most compact discs are packaged and sold in a polystyrene transparent plastic case, commonly referred to as a "jewel box". These jewel boxes are brittle and break easily when dropped on a hard surface or when mishandled. Once broken, these jewel boxes are incapable of adequately protecting the enclosed compact disc, and thus the compact disc will be exposed to dust, debris or damage.

Various prior art storage cases have been invented which store a plurality of compact discs. For example, U.S. Pat. No. 5,377,825 shows a compact disc storage case having a base hingedly connected to a cover with a pair of hubs and support segments extending therefrom. The hubs are adapted to receive a compact disc and the support segments freely support documentation therebetween.

U.S. Pat. No. 5,284,243 shows a multiple compact disc case with an insertable tray which snaps into an existing jewel box and includes two sides each having an engagement mechanism for engaging and holding a compact disc.

U.S. Pat. No. 5,269,409 shows a compact disc case with a plurality of rectangular components pivotally connected to one another at opposite ends so that the package opens into a zig-zag configuration. Each rectangular component is capable of storing at least one compact disc.

U.S. Pat. No. 4,535,888 shows a multiple compact disc storage case with two box-shaped covers hinged to a box-shaped center part. Each cover is capable of holding one compact disc and the center part is capable of holding two compact discs.

Further examples of prior art storage cases for compact discs are shown in U.S. Pat. Nos. 4,702,369, 5,101,971, 5,249,677, 5,284,248 and 5,402,882.

These prior art storage cases store one compact disc on each panel of the case. For example, one compact disc is stored on a base panel and one compact disc is stored on the lid panel. In order to allow the prior art cases to store more than two compact discs, a page or leaf must be mounted within the case to provide additional panels onto which additional compact discs may be stored for use.

Although these prior art storage cases are sufficient for the purpose for which they were intended, the storage case of the present invention improves upon the prior art by providing a compact case capable of storing up to four compact discs and which is free of a leaf or panel, and which has a compact size with a width less than twice the diameter of two compact discs. Two compact discs are stored adjacent to one another with one compact disc partially overlapping the other. The overlapped configuration maximizes the interior storage space of the case yet prevents the compact discs from contacting and damaging one another.

Therefore, the need exists for an improved multiple compact disc storage case which can be molded with two adjacent hubs on one of a base or lid and a pair of inwardly extending tabs on the other of the base or lid for holding two compact discs and associated graphics, respectively, or which can be molded with two adjacent hubs on both the base and lid for holding up to four compact discs in a very compact container. There is no such storage case of which I am aware which accomplishes these results.

SUMMARY OF THE INVENTION

Objectives of the invention include providing an improved multiple compact disc storage case which is molded as a one-piece member of an inexpensive lightweight plastic, such as a polypropylene, which is flexible and sturdy.

Another objective of the invention is to provide such a storage case which stores the compact discs side by side with one compact disc partially overlapping the other to reduce the overall size of the case.

A further objective of the invention is to provide such a storage case which can be molded with two adjacent hubs on one of a base or lid for holding up to two compact discs and a pair of inwardly extending tabs on the other of the base or lid for holding associated graphics, or which can be molded with two adjacent hubs on both the base and lid for holding up to four compact discs.

Another objective of the invention is to provide such a storage case in which one of the two adjacent hubs is raised to support the compact disc held thereon above and partially overlapping the other compact disc preventing the compact discs from contacting and damaging one another when in the overlapped stored configuration.

A still further objective of the invention is to provide such a storage case which includes a hang tab attached thereto by a reduced thickness living hinge which allows the case to be hung from a displayed rack for sale and which is easily removed after the case is purchased by a consumer.

These objectives and advantages are obtained by the multiple disc storage case of the present invention the general nature of which may be stated as including a base; a cover; hinge means extending between said base and cover for movement of the case between open and closed positions, said base and cover forming a storage compartment therebetween; first hub means formed on said base for holding a disc-shaped data storage medium; second hub means formed on said base for holding another disc-shaped data storage medium, said second hub means being raised to allow the disc-shaped data storage medium being held by the second hub means to be spaced from and partially overlap the disc-shaped data storage medium being held by the first hub means.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 3 is a sectional view taken from line 3—3, FIG. 2;

FIG. 5 is sectional view similar to FIG. 3 of the storage case of FIG. 4 in a closed position.

Similar numbers refer to similar parts throughout the drawings.

DESCRIPTION OF THE PREFERRED EMBODIMENTS

Figure 1:
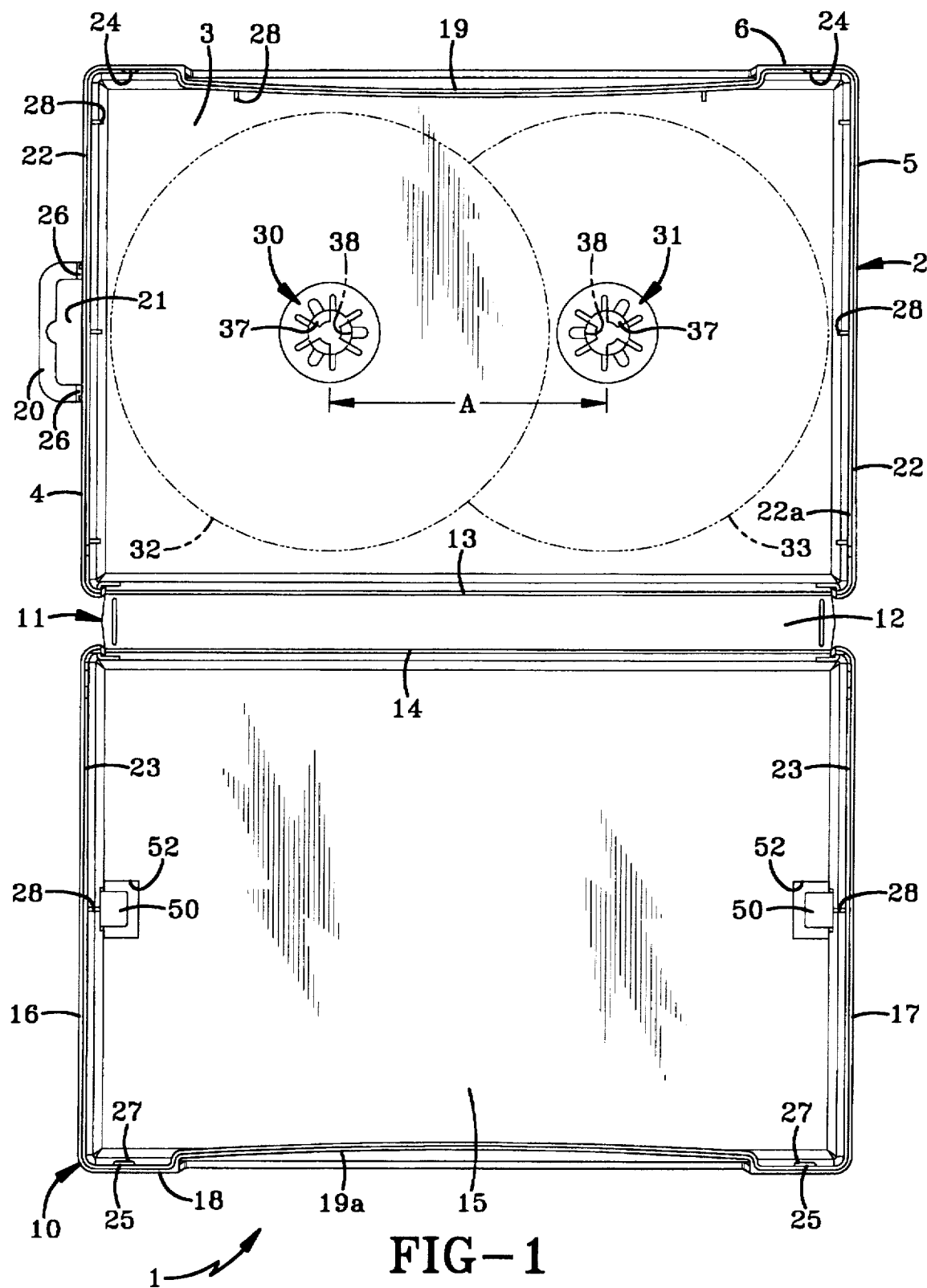
FIG. 1 is a top plan view of a first embodiment of the multiple disc storage case of the present invention in an open position and showing two compact discs in dot-dash lines being held therein in a partially overlapped configuration.
Figure 2:
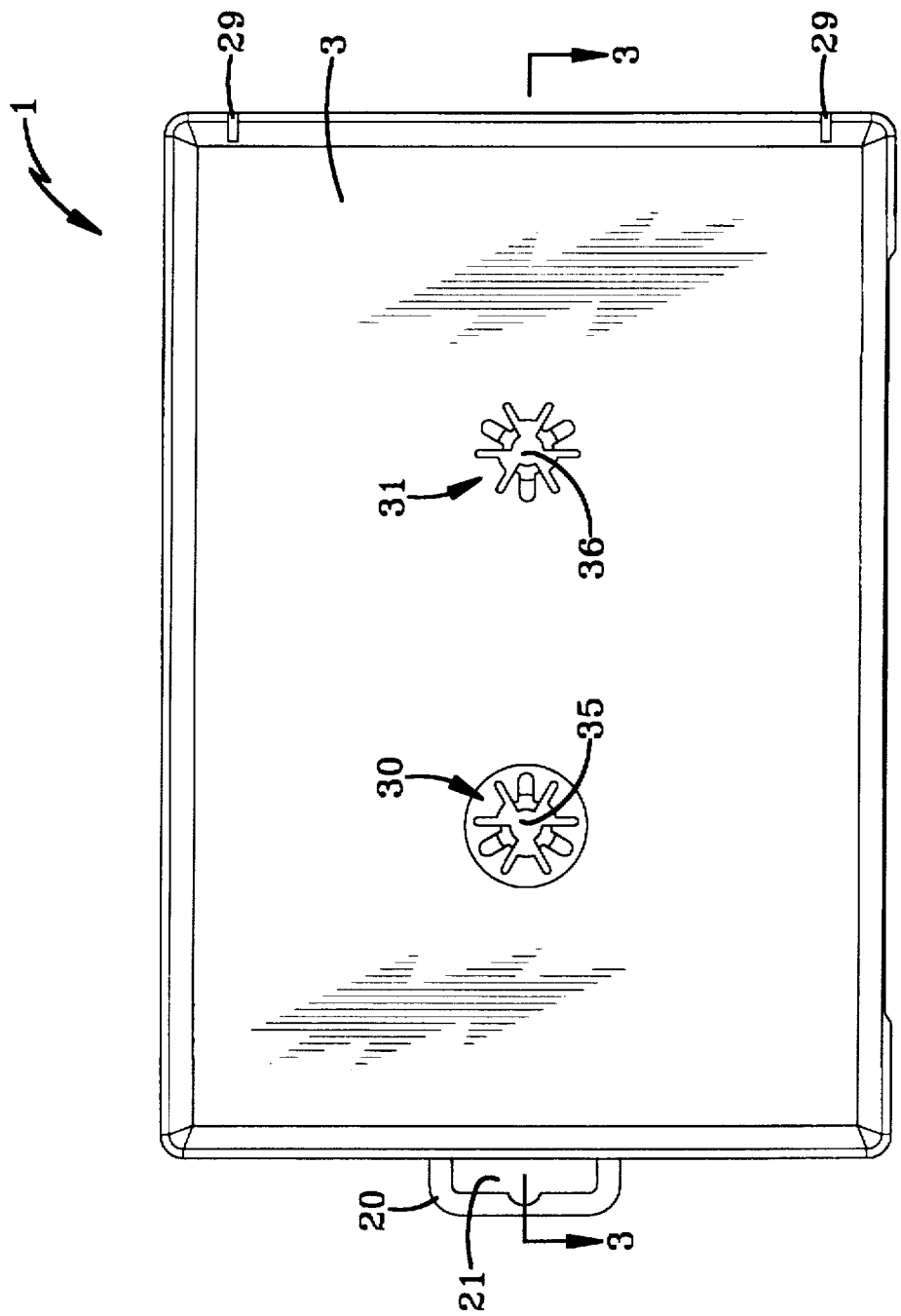
FIG. 2 is a bottom plan view of the storage case of FIG. 1 shown in a closed position.

A first embodiment of the storage case of the present invention is indicated generally at 1, and is shown in FIG. 1 in an open position. Case 1 has a rectangular box-shaped configuration and forms an internal storage compartment 7, as shown in FIG. 3. Case 1 preferably is molded as a one-piece member of a plastic material, such as polypropylene, and includes a three-sided base indicated generally at 2 (FIGS. 2 and 3), having a rectangular-shaped flat bottom wall 3 with upstanding parallel end walls 4 and 5 and a front wall 6. Walls 4, 5, and 6 are formed integrally with bottom wall 3 and are arranged in a U-shaped configuration to enclose three sides of bottom wall 3.

A flat rectangular-shaped cover or lid indicated generally at 10, is hinged movably mounted on base 2 by a double hinge panel assembly indicated generally at 11. Hinged panel assembly 11 includes an elongated rectangular-shaped panel 12, and is connected to the inner edges of base 2 and cover 10 by living hinges 13 and 14, respectively (FIG. 3).

Cover 10 includes a flat rectangular-shaped top closure wall 15 (FIG. 3), similar in size and configuration to bottom wall 3, along with upstanding parallel end walls 16 and 17 and a front wall 18. Walls 16, 17, and 18 are formed integrally with top closure wall 15 and are arranged in a U-shaped configuration to enclose three sides of closure wall 15.

Front walls 6 and 18 include inwardly angled arcuate-shaped sections 19 and 19a respectively, which extend partially to the end walls and allow a user to easily open case 1 when case 1 is in a closed position. A usual hang tab 20 may be formed integrally with one of the walls of base 2 or lid 10 by a reduced thickness tear-away strip of material 26 to enable the tab to be removed from the case after purchase. As shown in the drawings, tab 20 extends from bottom wall 3 at a bottom of end wall 4 and includes a generally T-shaped opening 21 formed therein, through which a rod or rods extend for vertically supporting case 1 on a rack for display.

An outwardly extending lip 22 (FIGS. 1 and 3) is formed in the top edge of walls 4–6 which receives an inwardly extending complementary shaped top edge 23 of walls 16–18 and which forms a shelf 22a upon which top edge 23 sits when case 1 is in the closed position. Edges 22 and 23 are latched in an engaged position by a pair of outwardly extending lugs 24 which are formed on edge 22 of front wall 6 of base 2 and a pair generally U-shaped flanges 27 which extend inwardly from front wall 18 of lid 10 to form openings 25 into which lugs 24 extend when case 1 is in the closed position providing a relatively dust free seal between edge 23 and edge 22.

A plurality of ribs 28 extend inwardly from walls 4–6, 16 and 17 to reinforce and prevent excessive inward bending or bowing of the walls. A pair of support flanges 29 (FIGS. 2 and 3) extend outwardly from end walls 5 and 17 of base 2 and lid 10, respectively, to allow case 1 to sit upright on a flat support surface.

In accordance with one of the features of the present invention, a pair of circular-shaped hubs 30 and 31 (FIGS. 1 and 3) are injection molded integrally with bottom wall 3 of base 2 through a pair of openings 35 and 36 (FIG. 2) formed in bottom wall 3. Hubs 30 and 31 include a plurality of flexible fingers 37 (FIG. 1) arranged in a circular configuration and resiliently frictionally engage the periphery of a circular opening 38 formed in the center of usual compact discs 32 and 33. Hubs 30 and 31 are shown in FIG. 1 holding compact discs 32 and 33, respectively, which are shown in dot-dash lines. The center of hubs 30 and 31 are spaced apart by a distance "A" which is slightly greater than the radius of one compact disc plus the radius of one hub, or approximately $2^{31}/_{32}$ inches.

In accordance with another of the features of the invention, hub 31 includes a stepped shoulder 40 (FIG. 3) which forms a shelf 42. Stepped shoulder 40 has a height of approximately $^{1}/_{16}$ inches and supports compact disc 33 above bottom wall 3 forming a gap 45 therebetween and prevents contact between bottom wall 3 and the data storage area located on the bottom surface of the compact disc.

Hub 30 includes a stepped shoulder 44 which has a height slightly greater than the height of stepped shoulder 40 of hub 31, or approximately $^{3}/_{16}$ inches. Stepped shoulder 44 forms a shelf 46 and supports compact disc 32 above bottom wall 3 forming a gap 48 therebetween. Stepped shoulder 44 allows compact disc 32 to partially overlap compact disc 33, as shown in FIGS. 1 and 3, forming a gap 49 between the two compact discs, and prevents disc 33 from contacting and damaging the data storage area of disc 32.

In accordance with still another feature of the invention, a pair of generally L-shaped tabs 52 extend inwardly from the top edge of end walls 16 and 17 to support graphics 60 (dot-dash lines, FIG. 3) against top closure wall 15 and prevent the graphics from contacting compact discs 32 and 33 when case 1 is in the closed position. A pair of retangular openings 50 are formed in top closure wall 15 during the molding of tabs 52.

Figure 4:
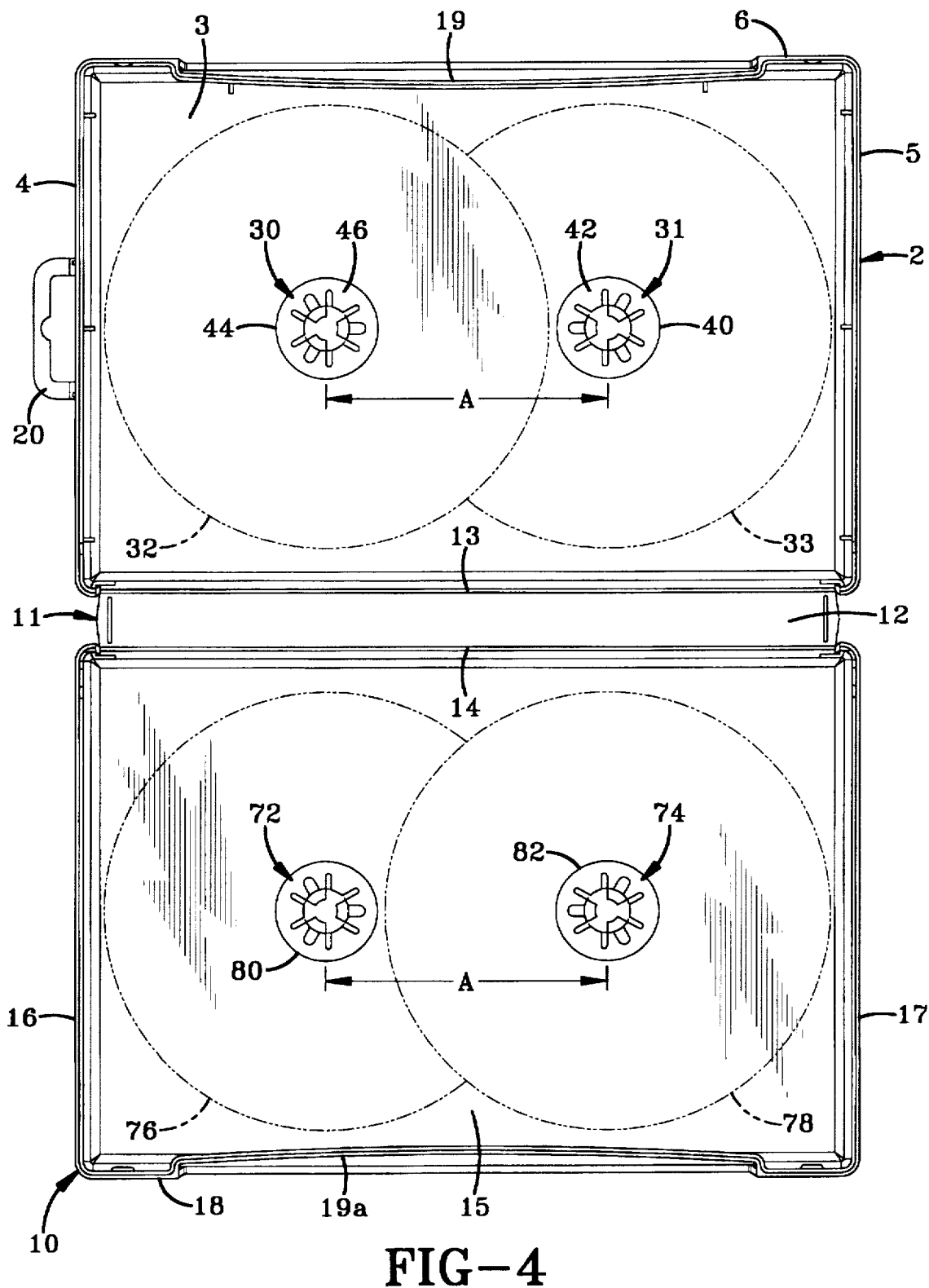
FIG. 4 is a top plan view of a second embodiment of the storage case of the present invention in an open position and showing four compact discs in dot-dash lines being held therein in overlapped position.

A second embodiment of the security case of the present invention is indicated generally at 70, and is shown in FIG. 4 in a full open position. Case 70 is similar in construction to case 1 and includes base 2 connected to lid 10 by hinge panel assembly 11. Hubs 30 and 31 are formed on bottom wall 3 of base 2 of case 72 for holding compact discs 32 and 33. A second pair of hubs 72 and 74, similar to hubs 31 and 30, respectively, are formed on closure wall 15 of lid 10 of case 70 for holding two additional compact discs 76 and 78. Hubs 72 and 74 are aligned with hubs 30 and 31, respectively, as shown by dot-dash line 75 when the case is in the closed position. Hubs 72 and 74 are also spaced apart by distance "A". Hub 72 has a stepped shoulder 80 similar in structure and function to stepped shoulder 40 of hub 31 described above, and hub 74 has a stepped shoulder 82 similar in structure and function to stepped shoulder 48 of hub 30 described above. Hubs 72 and 74 retain compact discs 76 and 78, respectively, in an overlapped configuration similar to that of hubs 30 and 31 as described above, and allow case 70 to hold up to four compact discs.

As shown in FIG. 4, case 70 stores four compact discs 32, 34, 76 and 78 out of contact with each other and free of any contact from the surrounding surfaces of the lid and base preventing possible damage to those areas of the compact discs containing the stored data. Discs 32 and 78 partially overlaps discs 33 and 76, respectively, maximizing the storage space of internal storage compartment 7 and minimizing the total size of case 70. Thus as shown in FIGS. 1 and 4, the width of cases 1 and 70 (measured between the end walls) is less than twice the diameter of the compact disc to provide a very compact storage case.

Accordingly, multiple compact disc storage cases 1 and 70 include base 2 and a cover 10 hingedly connected by a hinge panel 11 and a pair of living hinges 13 and 14. Lugs 24 latch base 2 to cover 10 and a relatively dust free seal is formed by the engagement of edge 23 with edge 22. Furthermore, hubs 30 and 31 resiliently frictionally secure compact discs 32 and 33 to base 2. Tabs 50 allow case 1 to hold up to two compact discs and graphics, and hubs 72 and 74 allow case 70 to hold up to four compact discs. Additionally, raised stepped shoulders 44 and 80 support discs 32 and 78, respectively, above discs 34 and 76, respectively, and allow discs 32 and 78 to partially overlap discs 34 and 76, respectively.

Accordingly, the improved multiple compact disc storage case is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the multiple compact disc storage case is constructed and used, the characteristics of the construction, and the advantageous, new and useful results obtained; the new and useful structures, devices, elements, arrangements, parts and combinations, are set forth in the appended claims.

I claim:

1. In combination, a pair of disc-shaped data storage media and a storage case for storing said media in a partial overlapped and spaced configuration, said case being an integral one-piece member formed of a plastic material including a base having a substantially flat continuous planar base wall extending between a pair of spaced parallel end walls, a front wall and a hinge;

a cover movably mounted on the base by the hinge for movement between open and closed positions with respect to said base and forming a parallelpiped in combination with the base when in the closed position; and first and second hubs formed integrally on the base wall in a spaced position and raised above said base wall, said second hub being raised above the base wall a greater distance than the first hub with one of said disc-shaped data storage media being held by the second hub in a spaced relationship above and partially overlapping the first disc-shaped data storage medium being held by the first hub in a spaced relationship above said base wall.

2. The combination defined in claim 1 in which the spaced distance between the first and second hubs is approximately $2^{31}/_{32}$ inches.

3. The combination defined in claim 1 in which the first hub includes a stepped shoulder which lies in a first plane spaced above and parallel to the plane of the base wall for retaining the disc-shaped data storage medium above the plane of the wall base; and in which the second hub includes a stepped shoulder which lies in a second plane spaced above the plane of the first hub for retaining the second disc-shaped data storage medium above the plane of the base and above the disc-shaped data storage medium held by the first hub.

4. The combination defined in claim 3 in which the stepped shoulder of the first hub has a height of approximately $1/_{16}$ inch above the plane of the base wall.

5. The combination defined in claim 4 in which the stepped shoulder of the second hub has a height of approximately $3/_{16}$ inch above the plane of the base wall.

6. The combination defined in claim 1 in which the cover is defined by a flat closure wall, a pair of spaced parallel end walls and a front wall; in which a pair of tabs extends inwardly from the closure wall; and in which graphics are held in juxtaposition with the closure wall by said tabs.

7. The combination defined in claim 1 in which the storage case is formed of polypropylene plastic material.

8. The combination defined in claim 1 in which a hanger tab is formed integrally with one of the end walls of one of the base and cover.

9. The combination defined in claim 8 in which the hanger tab is connected to the said one of the base and cover by a thin tearaway strip of material to permit the hanger tab to be removed therefrom.

10. The combination defined in claim 1 in which latch means is formed on the front walls of the base and cover to secure the cover in the closed position.

* * * * *